United States Patent [19]
Rowley et al.

[11] Patent Number: 5,789,827
[45] Date of Patent: Aug. 4, 1998

[54] TWO-WIRE INTERFACE TO AUTOMOBILE HORN RELAY CIRCUIT

[75] Inventors: David R. Rowley, Kearns; Cesar A. Montano, Pleasant Grove; Gordon B. Langford, Sandy, all of Utah

[73] Assignee: Sensitron, Inc., Midvale, Utah

[21] Appl. No.: 728,807

[22] Filed: Oct. 9, 1996

Related U.S. Application Data

[60] Continuation-in-part of Ser. No. 443,350, May 17, 1995, Pat. No. 5,576,684, which is a division of Ser. No. 219,106, Mar. 29, 1994, abandoned, which is a continuation of Ser. No. 60,346, May 10, 1993, Pat. No. 5,309,135.

[51] Int. Cl.$^6$ ............................................. B60R 21/20
[52] U.S. Cl. ...................... 307/9.1; 307/10.1; 307/116; 701/36; 701/49; 180/268; 180/271; 280/728.1
[58] Field of Search ................................ 307/9.1, 10.1, 307/116, 111, 119; 180/268–276; 280/728.1, 728.2, 728.3, 729, 730.1, 730.2, 731, 732–735, 738, 739, 745.1, 750; 340/438, 449, 384.6, 384.7; 200/61.54, 61.55, 61.56; 361/170, 179; 338/211, 50; 701/1, 36, 49

[56] References Cited

U.S. PATENT DOCUMENTS

| | | |
|---|---|---|
| Re. 32,003 | 10/1985 | Shoberg . |
| 3,174,125 | 3/1965 | Curby . |
| 3,229,511 | 1/1966 | Rossire . |
| 3,332,280 | 7/1967 | Fish et al. . |
| 3,517,999 | 6/1970 | Weaver . |
| 3,541,491 | 11/1970 | Worster . |
| 3,820,529 | 6/1974 | Gause et al. . |
| 3,878,711 | 4/1975 | Randolph, Jr. . |
| 3,888,117 | 6/1975 | Lewis . |
| 3,895,288 | 7/1975 | Lampen et al. . |
| 3,958,455 | 5/1976 | Russell . |
| 3,968,467 | 7/1976 | Lampen et al. . |
| 3,971,250 | 7/1976 | Taylor . |
| 4,023,054 | 5/1977 | Taylor . |
| 4,038,867 | 8/1977 | Andrews et al. . |
| 4,123,158 | 10/1978 | Reytblatt . |
| 4,152,304 | 5/1979 | Tadewald . |
| 4,191,470 | 3/1980 | Butter . |
| 4,235,141 | 11/1980 | Eventoff . |
| 4,252,391 | 2/1981 | Sado . |
| 4,258,100 | 3/1981 | Fujitani et al. . |
| 4,258,720 | 3/1981 | Flowers . |
| 4,268,815 | 5/1981 | Eventoff et al. . |
| 4,269,506 | 5/1981 | Johnson et al. . |
| 4,273,682 | 6/1981 | Kanamori . |

(List continued on next page.)

*Primary Examiner*—William M. Shoop, Jr.
*Assistant Examiner*—Peter Ganjian
*Attorney, Agent, or Firm*—Trask Britt & Rossa

[57] ABSTRACT

A system selectively completes a horn circuit through which electrical power is provided to a horn in an automobile. A relay is connected to a power supply and completes the horn circuit when a current signal passing through the relay has at least a threshold magnitude. A relay driver is selectively activated by processing circuitry. When it is activated, the relay driver is in a conductive state, and when it is not activated, the relay driver is in a high impedance state. When the relay driver is in the conductive state, it places the relay in series with a low potential conductor thereby establishing the current signal at at least the threshold magnitude. The processing circuitry is electrically connected to a manually actuated sensor, which may be a flexible potentiometer. The processing circuitry activates the relay driver when the manually actuated sensor is actuated. The processing circuitry receives electrical power from the relay when the relay driver is in the high impedance state, but receives essentially no electrical power from the relay when the relay driver is in the conductive state. While the processing circuitry receives essentially no electrical power from the relay, the processing circuitry momentarily places the relay driver in the high impedance state so that the processing circuitry may receive electrical power from the relay and determine whether the manually actuated sensor is still actuated. An auxiliary power supply provides electrical power to the processing circuitry while electrical power is not received from the relay.

15 Claims, 6 Drawing Sheets

U.S. PATENT DOCUMENTS

| | | | |
|---|---|---|---|
| 4,276,538 | 6/1981 | Eventoff et al. . | |
| 4,301,337 | 11/1981 | Eventoff . | |
| 4,306,480 | 12/1981 | Eventoff et al. . | |
| 4,314,227 | 2/1982 | Eventoff . | |
| 4,314,228 | 2/1982 | Eventoff . | |
| 4,315,238 | 2/1982 | Eventoff . | |
| 4,355,692 | 10/1982 | Ostrelich . | |
| 4,414,537 | 11/1983 | Grimes . | |
| 4,420,251 | 12/1983 | James et al. . | |
| 4,429,580 | 2/1984 | Testa et al. . | |
| 4,444,205 | 4/1984 | Jackson . | |
| 4,451,714 | 5/1984 | Eventoff . | |
| 4,461,085 | 7/1984 | Dewar et al. . | |
| 4,489,302 | 12/1984 | Eventoff . | |
| 4,503,705 | 3/1985 | Polchaninoff . | |
| 4,542,291 | 9/1985 | Zimmerman . | |
| 4,575,117 | 3/1986 | Uchida . | |
| 4,605,593 | 8/1986 | Iida . | |
| 4,639,711 | 1/1987 | Edholm et al. . | |
| 4,649,784 | 3/1987 | Fulks et al. . | |
| 4,703,335 | 10/1987 | Matsushita et al. . | |
| 4,715,235 | 12/1987 | Fukui et al. . | |
| 4,729,809 | 3/1988 | Dery et al. . | |
| 4,745,930 | 5/1988 | Confer . | |
| 4,748,433 | 5/1988 | Jackson et al. . | |
| 4,763,534 | 8/1988 | Hager . | |
| 4,786,764 | 11/1988 | Padula et al. . | |
| 4,810,992 | 3/1989 | Eventoff . | |
| 4,822,040 | 4/1989 | Raditic . | |
| 4,837,548 | 6/1989 | Lodini . | |
| 4,876,419 | 10/1989 | Lodini . | |
| 4,968,965 | 11/1990 | Naitou et al. . | |
| 4,979,763 | 12/1990 | Blackburn . | |
| 5,002,306 | 3/1991 | Hiramitsu . | |
| 5,065,322 | 11/1991 | Mazur et al. . | |
| 5,086,652 | 2/1992 | Kropp . | |
| 5,086,785 | 2/1992 | Gentile et al. . | |
| 5,109,341 | 4/1992 | Blackburn et al. . | |
| 5,134,248 | 7/1992 | Kiec et al. . | |
| 5,157,372 | 10/1992 | Langford | 338/211 |
| 5,172,790 | 12/1992 | Ishikawa et al. . | |
| 5,202,281 | 4/1993 | Ishibashi . | |
| 5,202,831 | 4/1993 | Blackburn et al. . | |
| 5,216,607 | 6/1993 | Diller et al. . | |
| 5,222,399 | 6/1993 | Kropp . | |
| 5,232,243 | 8/1993 | Blackburn et al. . | |
| 5,250,227 | 10/1993 | Margolin . | |
| 5,265,904 | 11/1993 | Shelton et al. . | |
| 5,265,905 | 11/1993 | Shelton . | |
| 5,269,559 | 12/1993 | Filion et al. . | |
| 5,269,560 | 12/1993 | O'Loughlin et al. . | |
| 5,275,432 | 1/1994 | Pray et al. . | |
| 5,297,976 | 3/1994 | VanDerStuyf et al. . | |
| 5,308,106 | 5/1994 | Heidorn . | |
| 5,309,030 | 5/1994 | Schultz | 307/10.1 |
| 5,309,135 | 5/1994 | Langford | 338/211 |
| 5,313,023 | 5/1994 | Johnson . | |
| 5,344,185 | 9/1994 | Cooke, II . | |
| 5,350,189 | 9/1994 | Tsuchitani et al. . | |
| 5,364,125 | 11/1994 | Brown et al. . | |
| 5,366,242 | 11/1994 | Faigle et al. . | |
| 5,369,232 | 11/1994 | Leonelli . | |
| 5,371,333 | 12/1994 | Kanai et al. . | |
| 5,383,473 | 1/1995 | Moberg . | |
| 5,387,819 | 2/1995 | Ueno et al. . | |
| 5,388,459 | 2/1995 | Inoue et al. . | |
| 5,395,802 | 3/1995 | Kiyota et al. . | |
| 5,396,439 | 3/1995 | Yamada . | |
| 5,398,962 | 3/1995 | Kropp . | |
| 5,399,819 | 3/1995 | Lang et al. . | |
| 5,413,378 | 5/1995 | Steffens, Jr. et al. . | |
| 5,419,176 | 5/1995 | Walker . | |
| 5,423,569 | 6/1995 | Reighard et al. . | |
| 5,439,249 | 8/1995 | Steffens, Jr. et al. . | |
| 5,441,302 | 8/1995 | Johnson et al. . | |
| 5,443,284 | 8/1995 | Strahl et al. . | |
| 5,443,286 | 8/1995 | Cunningham et al. . | |
| 5,447,327 | 9/1995 | Jarboe et al. . | |
| 5,454,589 | 10/1995 | Bosio et al. . | |
| 5,454,591 | 10/1995 | Mazur et al. . | |
| 5,456,492 | 10/1995 | Smith et al. . | |
| 5,458,366 | 10/1995 | Hock et al. . | |
| 5,460,405 | 10/1995 | Faigle et al. . | |
| 5,463,258 | 10/1995 | Filion et al. | 307/10.1 |
| 5,470,105 | 11/1995 | Rose et al. . | |
| 5,474,328 | 12/1995 | Nilsson . | |
| 5,478,111 | 12/1995 | Marchant et al. . | |
| 5,480,185 | 1/1996 | Lowe et al. . | |
| 5,483,845 | 1/1996 | Stein et al. . | |
| 5,489,119 | 2/1996 | Prescaro et al. . | |
| 5,489,806 | 2/1996 | Harris et al. | 307/10.1 |
| 5,490,411 | 2/1996 | Hogan . | |
| 5,494,311 | 2/1996 | Blackburn et al. . | |
| 5,515,725 | 5/1996 | Tabota et al. . | |
| 5,531,472 | 7/1996 | Semchena et al. . | |
| 5,539,259 | 7/1996 | Filion et al. | 307/10.1 |
| 5,554,890 | 9/1996 | Kinoshita | 307/10.1 |
| 5,576,684 | 11/1996 | Langford | 338/50 |
| 5,583,476 | 12/1996 | Langford . | |
| 5,589,715 | 12/1996 | Nishitani et al. | 307/10.1 |

TWO-WIRE INTERFACE TO AUTOMOBILE HORN RELAY CIRCUIT

RELATED APPLICATIONS

This is a continuation-in-part of application Ser. No. 08/443,350, filed on May 17, 1995, now U.S. Pat. No. 5,576,684, which is a divisional application Ser. No. 08/219, 106, filed on Mar. 29, 1994, abandoned, which is a continuation of application Ser. No. 08/060,346, filed May 10, 1993, U.S. Pat. No. 5,309,135.

BACKGROUND OF THE INVENTION

1. Field of the Invention

The invention relates to circuitry that controls completion of a circuit to actuate an automobile horn in response to actuation of a sensor.

2. State of the Art

In the 1980's, automobile manufacturers began putting air bags adjacent to steering wheel hubs. In many designs, an air bag system includes an air bag between a rigid steering wheel hub and an air bag cover. The hub, which is connected to a steering wheel shaft, supports the steering wheel. When the automobile has a sudden impact, a pressure capsule releases a burst of high pressure gas into the air bag. The air bag is inflated in response to the burst. The bag cover splits along a partially perforated line under the force of the air bag.

It is desirable that there be some sort of sensor that activates a horn in the automobile when pressed. It is preferred that the sensor be adjacent to the bag cover so that the automobile driver can quickly activate the horn by pressing against the bag cover. Circuitry is used to respond to actuation of the sensor to activate the horn.

SUMMARY OF THE INVENTION

A system selectively completes a horn circuit through which electrical power is provided to a horn in an automobile. The system may include a relay or other first switching circuitry. The relay is connected to a power supply and completes the horn circuit when a current signal passing through the relay has at least a threshold magnitude. A relay driver or other second switching circuitry may be selectively activated by processing circuitry. When it is activated, the relay driver is in a conductive or low impedance state, and when it is not activated, the relay driver is in a high impedance state. During the high impedance state, the relay driver (or other switching circuitry allows conduction of current that is below the threshold magnitude.

When the relay driver or other second switching circuitry is in the conductive or low impedance state, it places the relay in series with a low potential conductor (such as ground) thereby establishing the current signal at a level at least the threshold magnitude. The processing circuitry is electrically connected to a manually actuated sensor, which may be a flexible potentiometer, a membrane switch, or any of various other sensors. The processing circuitry may activate the relay driver when the manually actuated sensor is actuated and meets certain criteria. The processing circuitry may receive electrical power from the relay when the relay driver is in the high impedance state, but receives essentially no electrical power from the relay when the relay driver is in the conductive state.

While the processing circuitry receives essentially no electrical power from the relay, the processing circuitry may momentarily place the relay driver in the high impedance state so that the processing circuitry may receive electrical power from the current signal of the relay and determine whether the manually actuated sensor is still actuated.

An auxiliary power supply may provide electrical power to the processing circuitry while electrical power is not received from the relay. The auxiliary power supply may be a capacitor that may be recharged when the processing circuitry receives electrical power from the relay or other power source.

One embodiment of the system is a two wire or a two conductor system because the power (including a low voltage return (e.g., ground)) and control signals needed for the processing circuitry and relay driver to perform their jobs may be provided by only two conductors. Another embodiment of the system is a three wire system or a three conductor system because the power (including a low voltage return (e.g., ground)) and control signals needed for the processing circuitry and relay driver to perform their jobs may be provided by only three conductors. An interface with either two or three terminals, depending on which embodiment is used, may be included in the system between the processing circuitry and relay driver on one side, and the relay and ground on the other.

In an alternative embodiment of the two wire system, during an interrogation mode, the processing system does not shut off the switching circuitry, but rather relies on one or more auxiliary power supplies to provide power until the resumption of the standby mode.

In another alternative embodiment of a two wire system, the two wires are connected to V+ and ground conductors of an automobile computer. When the sensor is actuated, the processing circuitry activates the switching circuitry causing the V+ conductor to be electrically connected to ground. Upon this event, the automobile computer activates a relay signal to energize a relay to complete a horn circuit and sound a horn.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF PREFERRED EMBODIMENTS

Figure 1:
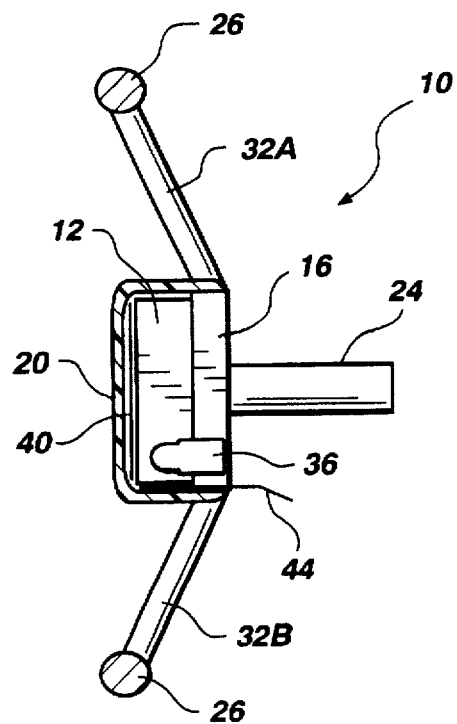
FIG. 1 is a side view of an air bag system including a sensor.
Figure 2:
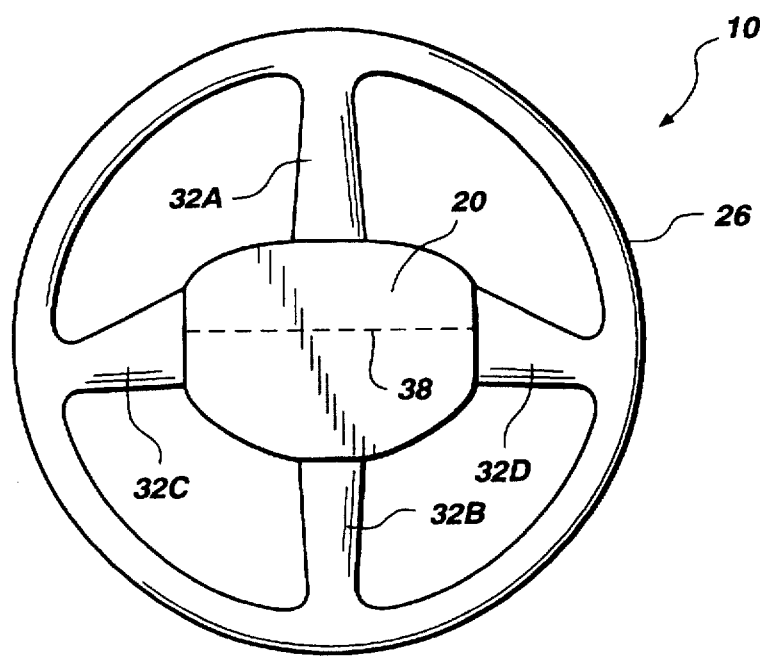
FIG. 2 is a front view of the air bag system of FIG. 1.

Referring to FIGS. 1 and 2, an air bag system 10 includes an air bag 12 between a rigid steering wheel hub 16 and an air bag cover 20. Hub 16, which is connected to steering wheel shaft 24, supports steering wheel 26 through supports 32A, 32B, 32C, and 32D. When the automobile has a sudden impact, a pressure capsule 36 (shown schematically) releases a burst of high pressure gas into air bag 12. Air bag 12 is inflated in response to the burst. Bag cover 20 splits along a partially perforated line 38 under the force of air bag 12.

A sensor 40 is positioned between bag cover 20 and air bag 12. Alternatively, sensor 40 could be positioned in or on bag cover 20. In a preferred embodiment, sensor 40 is a flexible potentiometer, which is a deflection sensor. Alternatively, sensor 40 could be a force sensor (such as an FSR (force sensing resistor) marketed by Interlink Electronics of Camarillo, Calif.). Other membrane switch sensors that vary a parameter other than resistance may be used. Various problems have been encountered with membrane switches in that they have a tendency to require too little or too much force to close. Accordingly, a flexible potentiometer or other deflection sensor is preferred.

A deflection sensor has an electrical parameter, such as resistance, that changes when the deflection sensor is deflected. A flexible potentiometer has a resistance that changes as the flexible potentiometer is deflected. When bag cover 20 is pressed, the deflection sensor deflects. A circuit responds to the change in parameter value causing the horn to honk. Details regarding flexible potentiometers are discussed below.

Although the following discussion refers to a sensor, the sensor could actually comprise a grid or series of sensors that cover a greater surface area than a single sensor. Sensor 40 is connected to circuitry through conductors 44. The number of conductors may vary depending on the arrangement of the sensor. For example, if a number of flexible potentiometer sensors are joined in a grid in series, only high and low voltage conductors (such as B+ and ground) are needed. If sensors are joined in parallel, additional conductors may be used, although they may not be needed if circuitry (such as OR gates) is placed adjacent to the sensors.

To avoid damaging the circuitry that determines whether to activate the automobile horn, such circuitry may be placed at a remote location from the sensor and the air bag. Alternatively, such circuitry may be placed adjacent to the sensors.

Various arrangements may be used for horn control circuitry. A first horn control circuitry arrangement includes an interface having three conductor terminals: (1) relay, (2) ground, and (3) power. A second horn control circuitry arrangement includes an interface having only two conductor terminals: (1) relay and (2) ground. The second arrangement has some advantages because many automobiles include circuitry that is prewired for a two terminal interface. A system using a three conductor interface is simpler and will be discussed first.

A. A System Using a Three Terminal Interface

Figure 3:
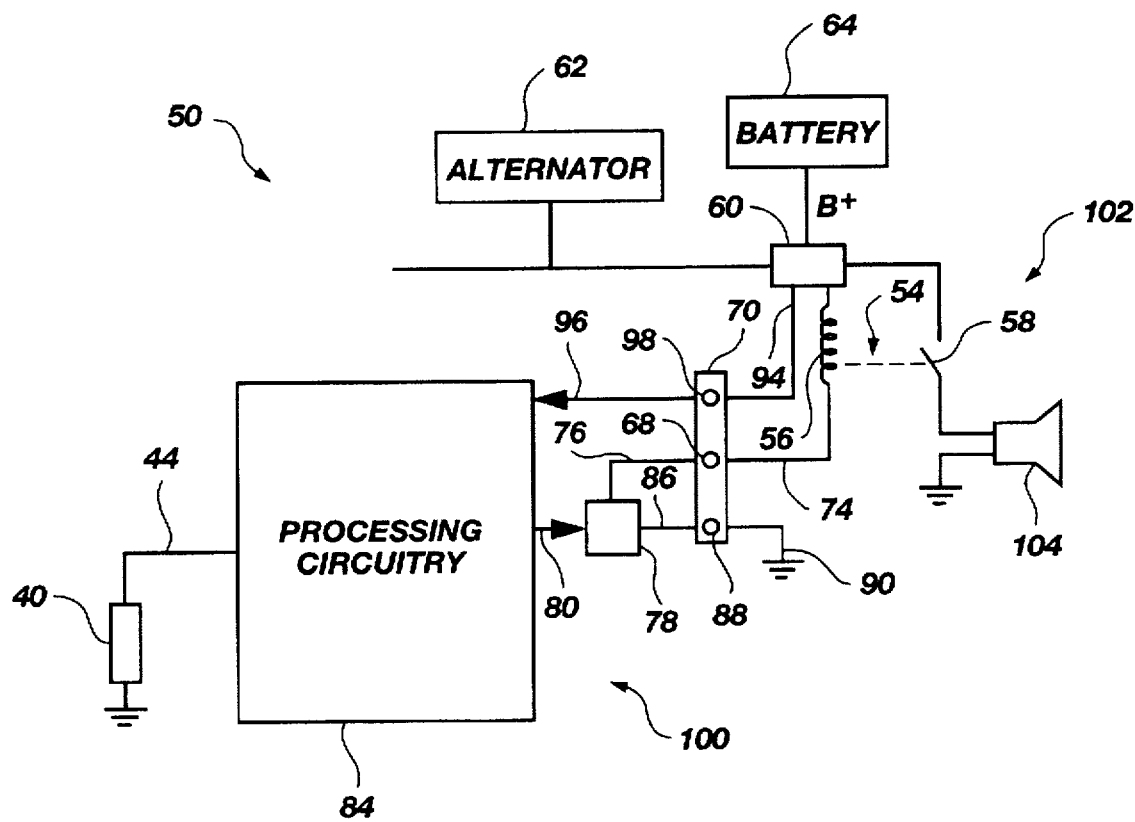
FIG. 3 is a schematic representation of a system with a three conductor interface arrangement used for selectively completing a horn circuit.

FIG. 3 illustrates a system 50, which is a preferred embodiment of the invention for selectively completing a horn circuit in a three terminal interface arrangement. System 50 also includes a relay 54 that includes a coil 56 and a switch 58. One end of relay 54 is connected to a distribution box 60 that receives electrical power from an alternator 62, a battery 64, or some other source. Distribution box 60 provides a voltage potential B+. Coil 56 is connected to switching circuitry 78 through a conductor 74, a terminal 68 of an interface 70, and a conductor 76. Processing circuitry 84 receives electrical power from distribution box 60 through a conductor 94, a terminal 98 of interface 70, and a conductor 96. Processing circuitry 84 controls switching circuitry 78 through an activation signal on a conductor 80. Switching circuitry 78 is electrically connected to a ground 90 (or some other potential significantly different from B+) through a conductor 86 and a terminal 88 of interface 70. System 50 includes control circuitry 100. Control circuitry 100 includes processing circuitry 84 and switching circuitry 78, which control whether switch 58 is closed.

System 50 is called a three wire or a three conductor system because the power (including a low voltage return (e.g., ground)) and control signals needed by control circuitry 100 to perform its job and interface with the other components of system 50 may be provided in only three conductors: conductors 76, 86, and 96. In addition, control circuitry 100 is also connected to sensor 40 Niu conductor 44. An interface, such as interface 70, is not necessary. In other words, conductor 94 could be connected directly to conductor 96, conductor 76 could be connected directly to coil 56, and conductor 86 could be connected directly to ground. However, interface 70 is useful in connecting control circuitry 100 to the remainder of system 50.

Sensor 40 (also shown in FIG. 1) is connected to processing circuitry 84. When sensor 40 is actuated, an electrical parameter of sensor 40 changes. For example, in the case of a flexible potentiometer, the resistance of sensor 40 would increase (or possibly decrease) upon deflection. Processing circuitry 84 is responsive to changes in the electrical parameter of sensor 40. Sensor 40 may be connected to a ground, which may be tied to ground 90.

When sensor 40 is actuated, processing circuitry 84 activates switching circuitry 78. When activated, switching circuitry 78 electrically connects conductor 76 to conductor 86, thereby placing coil 56 in series between B+ of distribution box 60 and ground 90. The voltage drop of about B+ creates a signal passing through coil 56 with sufficient magnitude to close switch 58. (The voltage drop across coil 56 may be less than B+ because there may be some voltage drops across circuits, such as a filter 114 shown in FIG. 4, or other circuitry not illustrated, but known to those skilled in the art.) With switch 58 closed, a circuit 102 including distribution box 60, switch 58, and horn 104 is completed and horn 104 is actuated or sounded.

Figure 4:
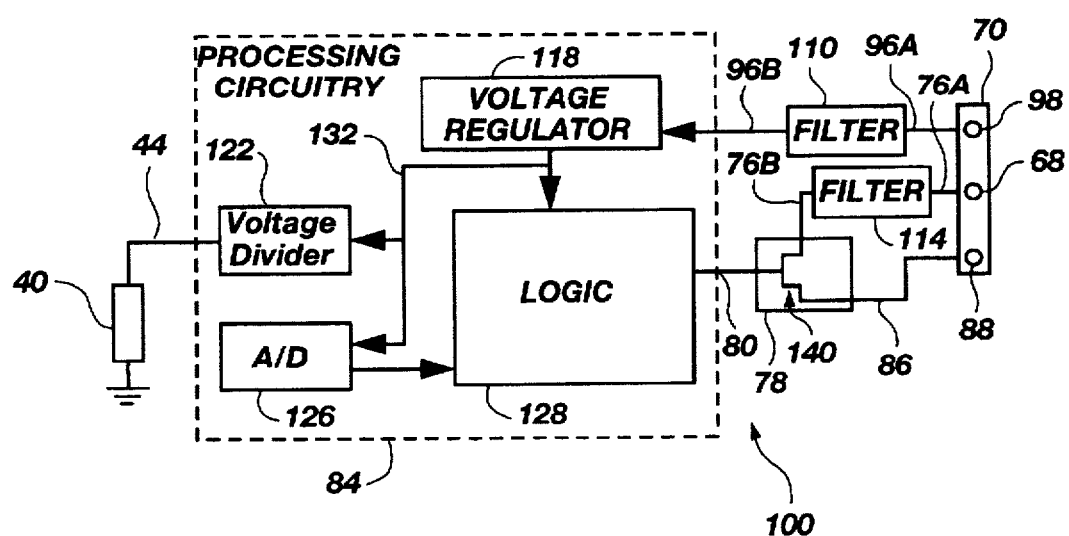
FIG. 4 is a more detailed schematic representation of a portion of the system of FIG. 3.

FIG. 4 provides a more detailed representation of that portion of system 50 to the left of interface 70. Referring to FIG. 4, the power signal on conductor 96 may be filtered by a filter 110 to remove noise or interference, such as EMI (electromagnetic interference) and RF (radio frequency) noise. Conductor 96 is shown being separated into conductors 96A and 96B. System 50 may also include a filter 114 to filter noise or interference on conductor 76 (shown as conductors 76A and 76B).

Processing circuitry 84 includes a voltage regulator 118 that provides electrical power to a voltage divider 122, an analog-to-digital converter (A/D) 126, and logic 128 through conductors 132. As used herein, the term "power" is intended to be general and not specific to voltage, current, or a combination of voltage or current. Logic 128 may be a microprocessor, dedicated hardware, or other circuitry. Logic 128 may include any memory utilized by the microprocessor, dedicated hardware, or other circuitry.

The following example is provided with the assumption that sensor 40 is a flexible potentiometer. In operation, when sensor 40 is deflected by an automobile driver's hand pressing against bag cover 20, the resistance of sensor 40 changes (e.g., increases). Voltage divider 122 creates an analog voltage that is related to the resistance of sensor 40. The analog voltage is converted to a digital value by A/D 126 and supplied to logic 128. If the digital value supplied by A/D 126 meets certain criteria, logic 128 provides the activation signal on conductor 80 to switching circuitry 78.

The criteria that must be met vary with particular designs. Under a preferred embodiment in which sensor 40 is a flexible potentiometer, logic 128 responds to changes in resistance rather than absolute values. Further, logic 128 responds to rapid changes in the resistance, but not to slower changes. Logic 128 may respond only if the change is above a threshold. Various circuits may be used.

In the case in which the parameter that changes in sensor 40 is something other than resistance, voltage divider 122 may be unnecessary. Further, other techniques may be used to detect a value of resistance. Sensor 40 may produce digital values in which case A/D 126 may be unnecessary.

Switching circuitry 78 may include a FET (field effect transistor) 140 or other transistor. Merely as an example, the current through switching circuitry 78 may be about 40 milliamps, or some other value. Switching circuitry 78 may include various other designs. Switching circuit 78 may be active low or active high, or be activated through some other signal.

As presently contemplated, processing circuitry 84, filters, and other well known circuitry not shown, and perhaps switching circuitry 78 may be formed in an ASIC (application specific integrated circuit). This ASIC may or may not also perform other automobile functions.

Distribution box 60 shows four conductors joined at different terminals. Alternatively, one or more of the conductors could be joined to the same terminal of distribution box 60 or directly to battery 64 or some other power source.

B. A System Using a Two Terminal Interface

Figure 5:
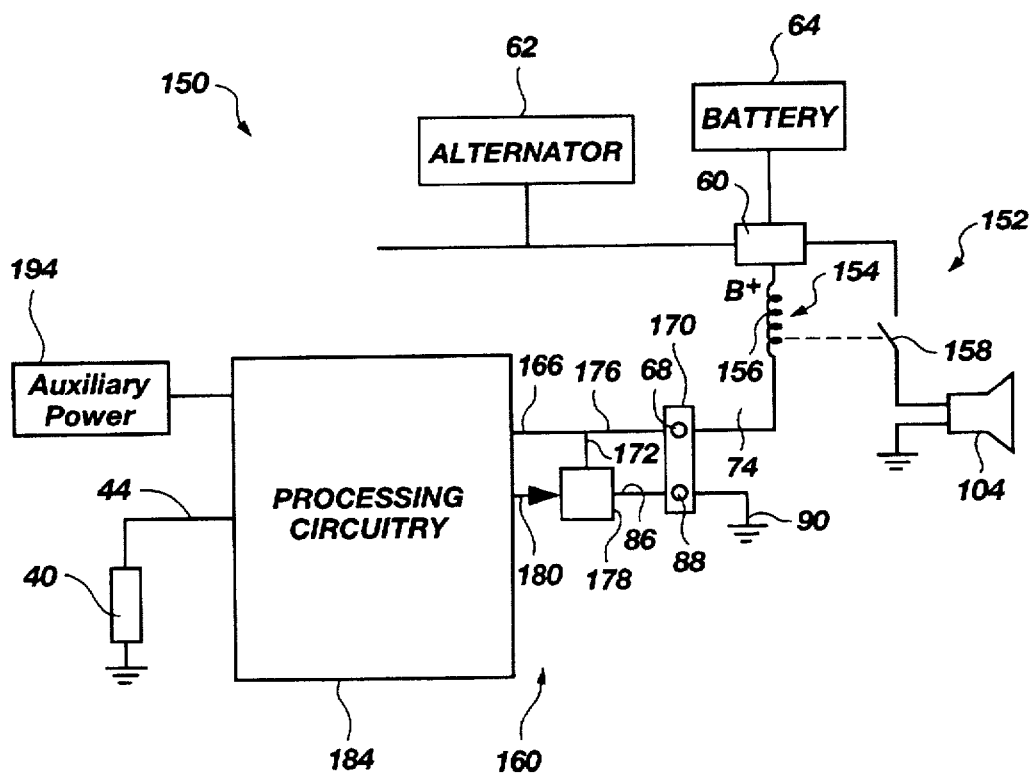
FIG. 5 is a schematic representation of a system with a three conductor interface arrangement used for selectively completing a horn circuit.
Figure 6:
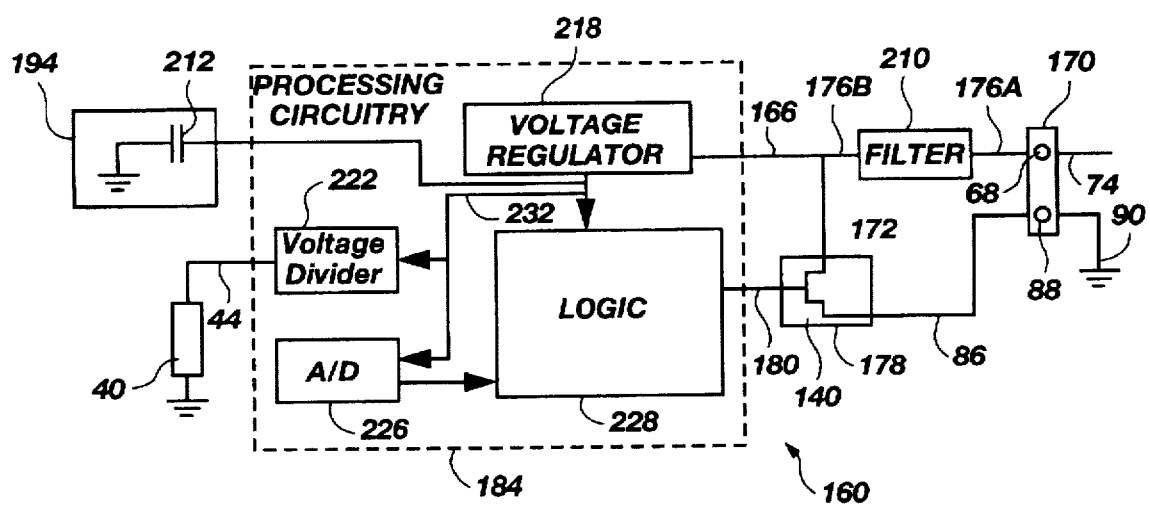
FIG. 6 is a more detailed schematic representation of a portion of the system of FIG. 5.

FIG. 5 illustrates a system 150, which is a preferred embodiment of the invention for selectively completing a horn circuit in a two terminal interface arrangement. FIG. 6 provides a more detailed representation of that portion of system 150 to the left of an interface 170. System 150 includes control circuitry 160. Control circuitry 160 includes processing circuitry 184 and switching circuitry 178, which control whether switch 158 is closed. System 150 is called a two wire or a two conductor system because the power (including a low voltage return (e.g., ground)) and control signals needed for control circuitry 160 to perform its job and interface with the other components of system 150 may be provided in only two conductors, namely, conductors 86 and 176. In addition, control circuitry 160 is also connected to sensor 40. An interface, such as interface 170 is not necessary. In other words, conductor 176 could be connected directly to conductor 74, and conductor 86 could be connected directly to ground, without an intermediate interface. However, interface 170 is useful in connecting control circuitry 160 to the remainder of system 150.

Referring to FIG. 5, system 150 includes distribution box 60, alternator 62, and battery 64. A horn circuit 152 is completed and actuates a horn 104 when a switch 158 of a relay 154 is closed. (Relay 54 of FIG. 3 and relay 154 of FIG. 5 may be identical or somewhat different.)

Coil 156 of relay 154 receives a voltage b+ from distribution box 60. A current signal $I_{COIL}$ passes through coil 156. Switch 158 is closed when relay 154 is energized through signal $I_{COIL}$ having a magnitude at least as great as a threshold magnitude $I_{ENERG}$.

System 150 differs from system 50 in several respects. In system 50, processing circuitry 84 constantly receives electrical power from distribution box 60 through conductors 94 and 96. However, in system 50, unless sensor 40 is being actuated, no signal passes through coil 56. By contrast, in system 150, signal $I_{COIL}$ always passing through coil 156. The magnitude of signal $I_{COIL}$ varies depending on whether switching circuitry 178 is activated.

Processing circuitry 184 operates in different modes. In a standby mode, sensor 40 is not actuated, switching circuitry 178 is not activated (and, therefore, conducts no current), and horn 104 is not actuated. During standby mode, processing circuitry 184 monitors or otherwise responds to actuation of sensor 40. The voltage on conductor 166 is $V_{IN}$, which is applied to processing circuitry 184. During standby mode, the value of $V_{IN}$ is $V_{IN-STANDBY}$. The voltage drop between B+ and conductor 166 creates a signal $I_{COIL}$ that has a magnitude that is less than $I_{ENERG}$. Accordingly, relay 154 is not energized and switch 158 does not close. (In the embodiment of FIG. 3, switching circuitry 178 is a relay driver.)

When sensor 40 is actuated, processing circuitry 184 leaves standby mode and begins horn sounding mode. In horn sounding mode, processing circuitry 184 activates switching circuitry 178. When switching circuitry 178 is activated, the impedance between conductors 172 and 86 is far smaller than the impedance of processing circuitry 184 from conductor 166. Therefore, virtually all of signal $I_{COIL}$ passes through switching circuitry 178 between conductors 172 and 176. Also, there is a very small voltage drop across switching circuitry 178. When switching circuitry 178 is activated, $I_{COIL}$ passes from coil 156 through conductors 176 and 172, switching circuitry 178, conductor 86, and terminal 88 of interface 170 to ground 90. The voltage $V_{IN}$ drops from $V_{IN-STANDBY}$ to close to ground, causing signal $I_{COIL}$ to increase to a magnitude that is at least as great as threshold $I_{ENERG}$. (There may be some voltage drops across filters and other well known, but not illustrated, circuitry.) When the magnitude of $I_{COIL}$ exceeds $I_{ENERG}$, switch 158 closes and horn 104 sounds.

Merely as an example, during steady state, when switching circuitry 178 is not activated, $I_{COIL}$ may be about 1 milliamp. When switching circuit 178 is activated, $I_{COIL}$ may be about 40 milliamps.

System 150 operates as follows to insure that horn 104 sounds when sensor 40 is actuated, and that horn 104 stops sounding when sensor 40 is no longer actuated. (However, in accordance with the specifications for some automobiles, processing circuitry 184 may be configured to temporarily deactivate switching circuitry 178 if the sensor 40 has been continuously actuated for more than a time limit, e.g. 20 seconds.)

Referring to FIGS. 5 and 6, an auxiliary power supply 194 provides electrical power to processing circuitry 184 when power is not provided through conductor 166. While switching circuitry 178 is activated, processing circuitry 184 is in a horn sounding mode, which is further divided into a low power or sleep mode, and an interrogation mode. During horn sounding mode, processing circuitry 184 periodically switches between low power mode and interrogation mode. As an example, interrogation mode could begin every 15 milliseconds and last for 1 millisecond. In that example, low power mode would last 14 milliseconds.

Auxiliary power supply 194 may include one or more capacitors, as illustrated by capacitor 212 in FIG. 6. Capacitor 212 is recharged when processing circuitry 184 is in standby mode or interrogation mode.

Figure 7A:
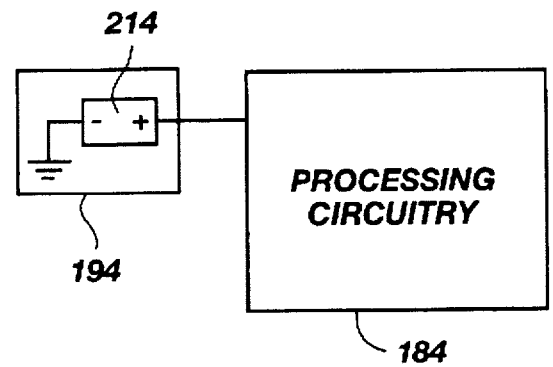
FIG. 7A is a schematic representation of a first alternative embodiment for a portion of the system of FIGS. 5 and 6.
Figure 7B:
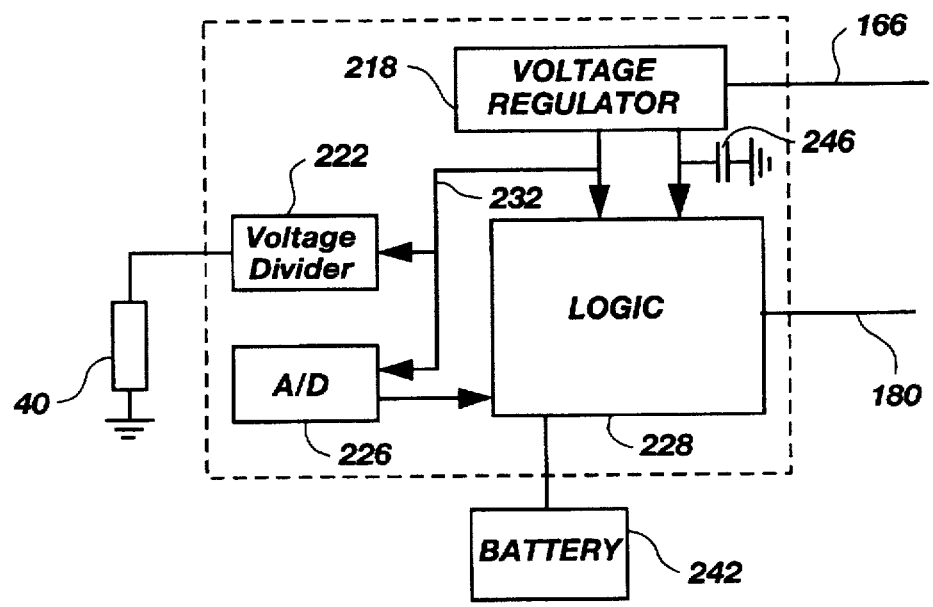
FIG. 7B is a schematic representation of a first alternative embodiment for a portion of the system of FIGS. 5 and 6.

Auxiliary power supply 194 may also include one or more batteries, as illustrated by battery 214, as shown in FIG. 7A. Auxiliary power supply 194 may include other components and/or a combination of a capacitor(s) and a battery(ies). In addition to or in place of auxiliary power supply 194, processing circuitry 184 may use a capacitor(s) and/or a battery(ies) in other locations, as illustrated by battery 242 and a capacitor 246, illustrated in FIG. 7B. The capacitor should be recharged when power is provided through conductor 166 to voltage regulator 218. Auxiliary power supply 194 may be included in an ASIC, although if a battery is used, it may be replaced if included outside the ASIC.

During the low power mode, auxiliary power supply 194 provides processing circuitry 184 with at least the minimal amount of power needed. In the embodiment of FIG. 6, the minimal power is used by logic 228 to keep switching circuitry 178 activated and to keep track of time and enter interrogation mode. During the first portion of interrogation mode, auxiliary power supply 194 may be used to provide electrical power to logic 228 (and perhaps also voltage divider 222 and A/D 226). Alternatively, voltage divider 222 and A/D 226 are not powered until power from conductor 166 is received by voltage regulator 218. Sensor 40 is connected to voltage divider 222 through conductor 44.

In the following example, it is assumed that sensor 40 has a resistance that changes upon actuation. Referring to FIGS. 5 and 6, when sensor 40 is actuated, the resistance of sensor 40 changes (e.g., increases). Voltage divider 222 creates an analog voltage, a value of which is related to the value of the resistance of sensor 40. The analog voltage is converted to a digital value by A/D 226 and supplied to logic 228. If the digital value supplied by A/D 226 meets certain criteria, logic 228 provides an activation signal on conductor 180 to switching circuitry 178. (Voltage regulator 218, voltage divider 222, A/D 226, and logic 228 may be identical to or differ from voltage regulator 118, voltage divider 122, A/D 126, and logic 128, respectively.)

During the interrogation mode, processing circuitry 184 momentarily (e.g. 1 millisecond) deactivates switching circuitry 178 so that no current passes through deactivated switching circuitry 178. Therefore, voltage $V_{IN}$ raises from about ground to $V_{IN\text{-}STANDBY}$, and signal $I_{COIL}$ provides power to processing circuitry 184. (Voltage $V_{IN}$ may not raise completely to $V_{IN\text{-}STANDBY}$ because of capacitance, but $V_{IN}$ raises enough to provide sufficient power to processing circuitry 184.) During interrogation mode, processing circuitry 184 determines whether sensor 40 is still actuated. If sensor 40 is still actuated, processing circuitry 184 reactivates switching circuitry 178. If sensor 40 is not still actuated, processing circuitry 184 does not reactivate switching circuit 178 and resumes standby mode.

If the duration of interrogation mode is short enough, switch 158 of relay 154 will not open during interrogation mode. Specifications for relays vary, but a typical relay will stay energized for 8 to 11 milliseconds without a current exceeding the threshold magnitude. One factor that contributes to the continuity of the sounding of horn 104 is that coil 156 has inductance which prevents instantaneous changes in current signal $I_{COIL}$, even though the voltage drop across coil 156 increases from about B+ to about (B+ minus $V_{IN\text{-}STANDBY}$) almost instantly. (Internal capacitance may delay the rise of the voltage of conductor 166. Also, there may be some voltage drops between conductor 166 and coil 156 in components, such as a filter.) There may also be inductance in filters and other well known, but unillustrated components. Mechanical inertia of the relay is another factor. The speed at which coil 156 will allow a change in current depends on specifications of coil 156 (and perhaps of any filter, and the other components). In FIG. 6, filter 210 filters noise and interference. The various filters may be analog or digital.

In another version of the two terminal system of FIG. 6, during interrogation mode, processing system 184 does not shut off the switching circuitry, but rather relies on one or more auxiliary power supplies to provide power until the resumption of standby mode. If a capacitor is used in auxiliary power supply 194, it may be recharged in standby mode.

Figure 8:
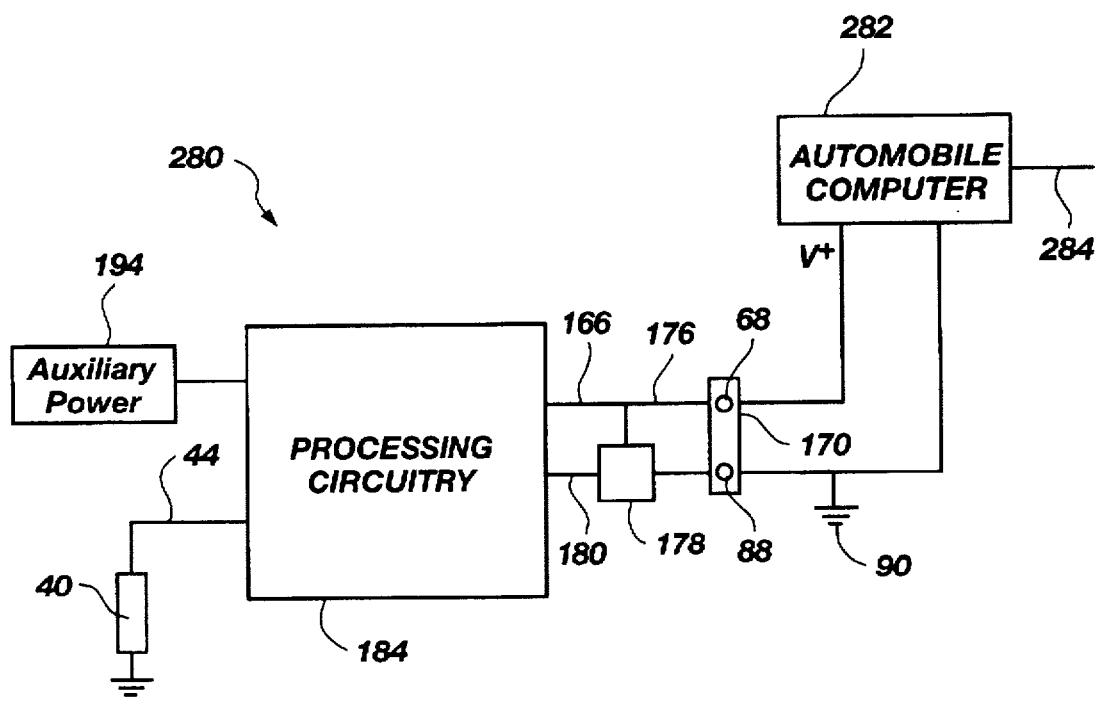
FIG. 8 is a schematic representation of a second alternative embodiment for a portion of the system of FIGS. 5 and 6.

FIG. 8 illustrates a system 280 in which terminals 68 and 88 are connected to V+ and ground conductors of an automobile computer 282. When sensor 40 is actuated, processing circuitry 184 activates switching circuitry 178, causing the V+ conductor to be electrically connected to ground 90. (A current limiting resistor should be used to prevent current overload.) Upon such an event, automobile shown to complete a horn circuit and sound a horn. When sensor 40 is not actuated, the V+ conductor supplies power to processing circuitry 184. Processing circuitry 184 in FIG. 8 goes through the same modes as in FIGS. 5 and 6. In the same way as does system 150, described in connection with FIGS. 5 and 6, processing circuitry 184 momentarily deactivates switching circuitry to get power. The deactivation is short enough so that the relay is not de-energized.

C. Details Regarding Flexible Potentiometers

Figure 9A:
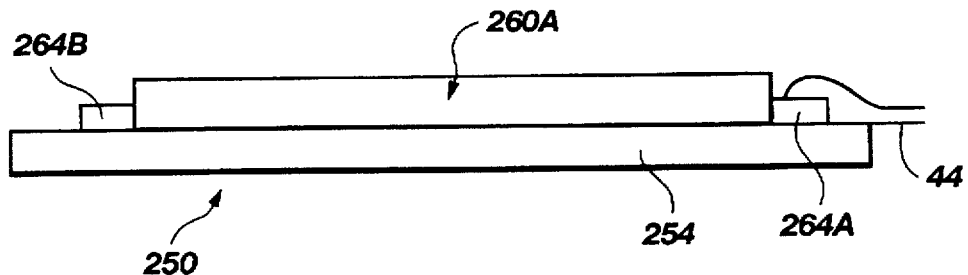
FIG. 9A shows a side view of one embodiment of a flexible potentiometer.
Figure 9B:
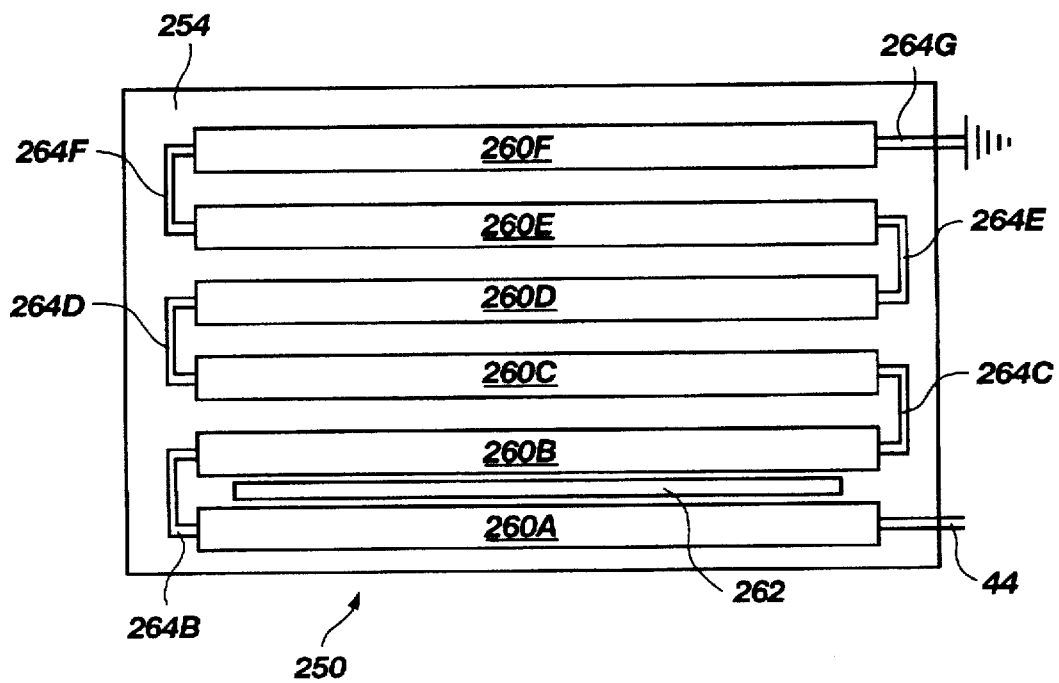
FIG. 9B shows a top view of the flexible potentiometer of FIG. 9A.

A flexible potentiometer may include more than one section of variable resistive material separated by a conductive material. The sections may form a grid and may be in series and/or in parallel. Components such as logic gates or buffers may separate the variable resistive materials. Referring to FIGS. 9A and 9B, a flexible potentiometer 250 includes a substrate 254 on which variable resistive material sections 260A, 260B, ... 260F are applied. Variable resistive material sections 260 are joined to each other by conductive materials 264B, 264C, ... 264F. Variable resistive material sections 260 are joined to conductor 44 and ground through conductive materials 264A and 264G. Openings may be cut or formed in substrate 254 between variable resistive materials 260A and 260B, between 260B and 260C, between 260C and 260D, etc. to increase the flexibility of substrate 254. Opening 262 is an example. Other openings are not shown to avoid clutter.

Substrate 254 may be constructed of various materials including various polymers, such as polyamide, polycarbonate, polyimide (Kapton), and polyester (Mylar), which may be thermoplastics. Substrate 254 may be bag cover 20.

Applying variable resistive materials in parallel on a substrate is only one of many configurations. For example, variable resistive materials may be applied in diagonal arrangements. The particular arrangement chosen may depend somewhat on the shape of the bag cover and the bag. Further, different sections of variable resistive material may have different initial resistance values depending on the shape of the bag cover and the bag. Individual flexible potentiometers may be in a cantilevered arrangement to keep the substrate from approaching its yield point. In a cantilevered arrangement, one end may be suspended over an extension from the substrate. The substrate may be placed between two plates having extensions between which the cantilevered sections may be deflected.

Flexible potentiometers are marketed under the mark Bend Sensor™ by Flexpoint, Inc., 656 West 7250 South, Midvale, Utah, 84047, which is associated with inventor Gordon B. Langford. Deflection sensors, other than flexible potentiometers, may have another electrical parameter that is altered through deflection. The variable resistance material may be formed of an electrically conductive ink which predictably changes electrical resistance upon deflection or bending between a first configuration and a second configuration. Various types of phenolic resin materials are presently believed to be suitable for the variable resistance material. For example, a phenolic resin Formula 3609 manufactured by Electronic Materials Corporation of America (EMCA-REMEX Products, Ablestik Electronic Materials & Adhesives), 160 Commerce Drive, Montgomeryville, Pa., 18936, has been found suitable in that it is elastically flexible or bendable for many thousands of cycles or bends.

The variable resistive material may be a two-part epoxy material, a thermoset adhesive, or a thermoplastic, all incorporating conductive material such as graphite or carbon. The variable resistance material may include a carbon ruthenium.

Merely as examples, the substrate may be from about 0.005 to about 0.010 inches in thickness (although various other thicknesses may be acceptable); the variable resistive material may be from about 0.0003 to about 0.001 inches in thickness (although various other thicknesses may be acceptable).

To attach to a substrate, the variable resistance material may include a material which facilitates wetting, gluing, or sticking. The variable resistance material may include graphite in combination with a binder. The variable resistance material is preferably of the type which is applied to the substrate in liquid form and which in turn dries to a solid form.

A flexible potentiometer or series or grid of flexible potentiometers may be used to measure a degree or angle of deflection. Generally, the more the deflection, the greater the resistance. With measurements, a relationship between the degree or angle of deflection and the resistance can be developed and used in software that would be relatively simple to create.

Segmented, constant resistance conductive material may be used in combination with a flexible potentiometer to reduce the resistance. The segmented conductors may be made of silver, silver alloys, or other conductive metals, as well as conductive carbon-based compounds. The segmented conductors may be applied in a liquid form, or applied in a solid form which is pressed onto the variable resistance material. The conductivity of the segmented conductors remains essentially constant upon deflection. Therefore, the segmented conductors provide paths for electrical current that are in parallel with the path provided by the variable resistance material. The segmented conductors act as attenuators. It is believed that the segmented conductors may help to make the resistance versus load curve of a flexible potentiometer more linear. The segmented conductors may help make the resistance at a particular deflection configuration more consistently repetitive.

The variable resistance material may be spray painted, rolled, silk screened, or otherwise printed onto the substrate (which may be the inside of the bag cover). The variable resistance material may be a solid which is pressed onto the substrate. In the case where the bag cover is the substrate, another substrate, such as a polyester substrate, may be unnecessary. Such an arrangement could be used without extensions or cantilevers, relying on deflections of the bag cover to produce deflections in the variable resistance material of the flexible potentiometer.

It is believed but not known that as a flexible potentiometer (of some or all compositions) is deflected, the variable resistance material cracks or deforms. That is, in some or all compositions, dried variable resistance material has a granular or crystalline-type structure which cracks or breaks upon deflection. As the variable resistance material deflects, the number of cracks and the space between them is believed to increase, thereby changing the electrical resistance in a predictable manner. The change can be measured upon application of suitable electrical signals.

A conductive substrate may be used. The substrate may be connected to a particular potential, such as ground. Alternatively, a non-conductive coating may be applied to the substrate.

Certain flexible potentiometers have a substantial change in resistance only when deflected in a first direction from a straight position, not when deflected in an opposite direction from a straight position. Other flexible potentiometers change resistance in either direction from a straight position. There are various ways of constructing a deflection sensor that senses deflection in two directions from the straight position. Under a first construction, a first layer of variable resistance material is applied to one side of a substrate and a second layer of variable resistance material is applied to the other side of the substrate. Under a second construction, a layer of antimony tin oxide is applied over a substrate (e.g. a Kapton substrate), and a layer of variable resistive material is applied to the layer of antimony tin oxide. An extra layer of carbon may be applied over the layer of variable resistive material. When the substrate is deflected in a first direction from the straight position, the resistance of the variable resistance material increases by a predictable and repeatable amount. When the substrate is deflected in a second direction from the straight position, the resistance of the variable resistance material decreases by a predictable and repeatable amount. Under another technique, a layer of variable resistance material is applied to a single side of a substrate. The substrate is deflected to an initial setting so that the variable resistance material has an initial resistance value greater than that of the straight position. As the deflection of the substrate is increased from the initial setting, the resistance increases. As the deflection of the substrate is decreased from the initial setting, the resistance decreases. One end of the flexible potentiometer may be weighted and the deflection may be about a pivot point.

D. Additional Information

As used herein, two components are "electrically connected" if a signal from one component may pass to the other components. A first and second component may be "electrically connected" even though there is another component between the first and second component or even though not all of the signal from the first component is received by the second (e.g., the second component and a third component are in parallel and each receive part of a signal).

The term "automobile" is interpreted broadly to include cars, trucks, and other vehicles that include air bags.

In the present disclosure, when it is said that a particular component, such as switching circuitry 178, conducts no signal or no current, it is understood that there may be leakage current, but such leakage current is so small as to be negligible.

The term "essentially no" of a parameter includes either a very small amount of a parameter or none of the parameter.

Although a standard relay is contemplated, a more complicated relay with an auxiliary circuit may be used. The relay may complete the circuit by sending a signal to a remote circuit that completes the circuit.

Having thus described in detail preferred embodiments of the present invention, it is to be understood that the invention defined by the appended claims is not to be limited by particular details set forth in the above description as many apparent variations thereof are possible without departing from the spirit or scope thereof.

What is claimed is:

1. A system for operating a horn in a vehicle, said system comprising:

a horn mechanically associated with a vehicle, said horn being configured to generate an audible signal;

power supply means associated with said vehicle for providing electrical energy at a first power level and at a second power level lower, said second power level being less in magnitude than said first power level;

first switching means connected to said power supply means to receive said electrical energy at said first power level and at said second power level, said first switching means being configured to supply said electrical energy at said first power level to said horn to cause said horn to generate said audible signal, said first switching means being operable between an inactive condition in which said electrical energy at said first power level is not supplied to said horn and an active condition in which said electrical energy at said first power level is supplied to said horn, said first switching means being configured to receive a first operation signal and a second operation signal, said first switching means being urged to said active condition by said first operation signal and to said inactive condition by said second operation signal, and said first switching means being configured to supply said electrical energy at said first power level in said active condition and at second power level in said inactive condition;

second switching means connected to said first switching means to receive therefrom, said electrical energy at said first power level and at said second power level, said second switching means being operable between a first state in which said first operation signal is supplied to said first switch means to urge said first switch means to said active condition and in which said electrical energy at said first power level is received by said second switching means, and a second state in which said second operation signal is supplied to said first switching means to urge said first switching means to said inactive condition, said first operation signal being said electrical energy at said first power level and said second operation signal being said electrical energy at said second power level;

activation means for operation by a user between a first position to generate an activate signal and a second position to generate a deactivate signal, said activation means being associated with the steering mechanism of said vehicle;

activation conductor means connected to said activation means for supplying said activate signal and said deactivate signal;

processing conductor means connected to said second switching means to receive electrical energy therefrom; and processing means electrically connected by said activation conductor means to said activation means to receive said activate signals and said deactivate signals and by said processing conductor means to said second switching means to receive said electrical energy at said second power level and to supply a first processing signal and a second processing signal thereto, said processing means being configured to generate and supply to said processing conductor means said first processing signal for urging said second switching means into said first state upon detection of said activate signal and to generate and supply to said processing conductor means said second processing signal for urging said second switching means into said second state upon the detection of said deactivate signal.

2. The system of claim 1 wherein said first switching means includes a relay switch having a coil connected to said power supply means to receive said electrical energy at said first power level and at said second power level.

3. The system of claim 2 wherein said relay switch also includes switch structure associated with said coil to be operable between said active condition and said inactive condition, said switch structure being connected to said power supply means to receive electrical power at said first power level and to said horn to activate said horn in said active condition.

4. The system of claim 3 wherein said coil is configured to be operable by said electrical energy at said first power level to urge said switch structure to said active condition.

5. The system of claim 4 wherein said switch structure is operable to attain the inactive condition when said coil is receiving said electrical energy at said second power level.

6. The system of claim 1 wherein said second switching means is configured to present a high electrical impedance in said second state and a low electrical impedance in said first state.

7. The system of claim 6 wherein said processing means is configured to receive said electrical energy at said second power level when said second switching means is in said second state.

8. The system of claim 1 wherein said power supply includes a first source connected to said first switching means to supply electrical energy thereto and a second source connected to said processing means to supply electrical energy thereto.

9. The system of claim 8 wherein said second source is a circuit with capacitance configured to receive electrical energy from said first source through said first switch means and said processing means.

10. The system of claim 8 wherein said second source is a conductor connected to receive electrical energy from said first source and to supply electrical energy to said processing means.

11. The system of claim 1 wherein said processing means includes a logic circuit structured to cause said processing means to periodically generate said second processing signal for a time less than the time for the first switch means to operate from an active condition to an inactive condition when the activation means is generating said activate signal and said processing means is generating said first processing signal and in turn said second switch means is in said first state and generating said first operation signal.

12. The system of claim 11 wherein said activation means includes a flexible potentiometer.

13. A system for operating a horn in a vehicle, said system comprising:

a horn mechanically associated with a vehicle, said horn being configured to generate an audible signal;

power supply means associated with said vehicle for providing electrical energy at a first power level and a second power level lower, said second power level being less in magnitude than said first power level;

first switching means connected to said power supply means to receive said electrical energy at said first power level and at said second power level, said first switching means being configured to supply said electrical energy at said first power level to said horn to cause said horn to generate said audible signal, said first switching means being operable between an inactive condition in which said electrical energy at said first power level is not supplied to said horn and an active condition in which said electrical energy at said first power level is supplied to said horn, said first switching means being configured to receive a first operation signal and a second operation signal, said first switching means being urged to said active condition by said first operation signal and to said inactive condition by said second operation signal, and said first switching means being configured to supply said electrical energy at said first power level in said active condition and at second power level in said inactive condition;

a first switch conductor interconnecting said first switch means and said second switch means for supply electrical signals therebetween;

second switching means connected to said first switch conductor to receive therefrom, said electrical energy at said first power level and at said second power level said second switching means being operable between a first state in which said first operation signal is supplied to said first switch means to urge said first switch means to said active condition and in which said electrical energy at said first power level is received by said second switching means, and a second state in which said second operation signal is supplied to said first switching means to urge said first switching means to said inactive condition, said first operation signal being said electrical energy at said first power level and said second operation signal being said electrical energy at said second power level;

activation means for operation by a user between a first position to generate an activate signal and a second position to generate a deactivate signal, said activation means being associated with the steering mechanism of said vehicle;

activation conductor means connected to said activation means for supplying said activate signal and said deactivate signal;

processing conductor means connected to said second switching means to receive electrical energy therefrom; and processing means electrically connected by said activation conductor means to said activation means to receive said activate signals and said deactivate signals and by said processing conductor means to said second switching means to receive said electrical energy at said second power level and to supply a first processing signal and a second processing signal thereto, said processing means being configured to generate and supply to said processing conductor means said first processing signal for urging said second switching means into said first state upon detection of said activate signal and to generate and supply to said processing conductor means said second processing signal for urging said second switching means into said second state upon the detection of said deactivate signal.

14. The system of claim 13 further including a second switch conductor connected to said second switch means and to ground.

15. The system of claim 14 further including a connection block associated with said vehicle and interconnected in said first switch conductor between said first switching means and said second switching means and interconnected in said second switch conductor between said second switching means and ground.

* * * * *